(12) United States Patent
Oohigashi

(10) Patent No.: US 6,220,324 B1
(45) Date of Patent: Apr. 24, 2001

(54) VEHICLE TIRE HAVING TREAD

(75) Inventor: Hiroshi Oohigashi, Ashiya (JP)

(73) Assignee: Sumitomo Rubbert Industries, Ltd., Kobe (JP)

( * ) Notice: Subject to any disclaimer, the term of this patent is extended or adjusted under 35 U.S.C. 154(b) by 0 days.

(21) Appl. No.: 09/272,247

(22) Filed: Mar. 19, 1999

(30) Foreign Application Priority Data

Mar. 20, 1998 (JP) .................................. 10-072545

(51) Int. Cl.⁷ .......................... B60C 11/11; B60C 111/00
(52) U.S. Cl. ....................................... 152/209.8; 152/904
(58) Field of Search ........................... 152/209.8, 209.9, 152/902, 904; D12/147

(56) References Cited

U.S. PATENT DOCUMENTS

| | | | |
|---|---|---|---|
| D. 336,068 | * 6/1993 | Attinello | D12/147 |
| 4,984,616 | * 1/1991 | Shepler et al. | 152/209.8 |
| 5,415,215 | * 5/1995 | Covert et al. | 152/209.9 |
| 5,658,404 | * 8/1997 | Brown et al. | 152/209.9 |
| 5,702,545 | * 12/1997 | Toyoshima et al. | |
| 5,967,210 | * 10/1999 | Himuro | 152/209.8 |

FOREIGN PATENT DOCUMENTS

539346 * 4/1993 (EP) ..................................... 152/904

* cited by examiner

Primary Examiner—Steven D. Maki
(74) Attorney, Agent, or Firm—Birch, Stewart, Kolasch & Birch, LLP

(57) ABSTRACT

A vehicle tire having an outside tread part and an inside tread part to be placed on the outside and inside of a vehicle, respectively, the inside tread part provided with inside axial grooves to be circumferentially divided into inside blocks, the outside tread part provided with outside axial grooves and outside circumferential grooves to be circumferentially and axially divided into outside blocks, and the inclinations of the grooves when looking down the tire are as follows: the outside axial grooves are inclined toward one direction such that the outer ends thereof are positioned backward of the inner ends, and the inclination angle $\alpha$ is in the range of from 60 to 80 degrees with respect to the tire equator C; the outside circumferential grooves are inclined toward one direction such that the outer ends thereof are positioned forward of the inner ends, and the inclination angel $\gamma$ is in the range of from 15 to 45 degrees with respect to the tire equator C; and the inside axial grooves are inclined at an angle $\beta$ of 80 to 100 degrees with respect to the tire equator C.

3 Claims, 5 Drawing Sheets

VEHICLE TIRE HAVING TREAD

BACKGROUND OF THE INVENTION

The present invention relates to a vehicle tire having an improved tread pattern capable of improving off-road grip such as traction and side grip, and more particularly to an asymmetrical tread patterns specialized for right tire and left tire.

In order to improve road grip during off-road running such as side grip, traction, braking and the like, many attempts have been made, and it has been believed that important factors in improving road grip are the inclination of the edges of tread elements such as blocks and the like, namely the inclination of tread grooves defining such elements, and the lengths of the edges. Hitherto, therefore, when much importance is attached to the traction performance, the total length of axially extending edges has been increased. On the other hand, when much importance is attached to the side grip performance, the total length of circumferentially extending edges has been increased. However, it is difficult to effectively improve the road grip in all directions, traveling direction i.e. in the and in the side direction.

SUMMARY OF THE INVENTION

It is therefore, an object of the present invention to provide vehicle tires, in which off-road grip performances such as traction and side grip are effectively improved.

The present invention is based on the fact that the outside part of the tread with respect to the vehicle has a greater influence upon the side grip than the inside part, but the inside part of the tread has a greater influence upon the traction performance than the outside part. Therefore, the tread pattern is changed between the outside tread part and inside tread part such that the inclination of tread grooves is macroscopically steeper in the outside tread part than the inside tread part.

According to one aspect of the present invention, a vehicle tire comprises.

a tread having an outside tread edge and an inside tread edge to be placed on the outside and inside of a vehicle, respectively.

The tread comprises an inside tread part extending from the inside tread edge toward the tire equator, and an outside tread part extending from the outside tread edge toward the tire equator.

The inside tread part is provided with inside axial grooves extending axially across this part so as to circumferentially divide this part into blocks.

The outside tread part is provided with outside axial grooves extending axially across this part, and outside circumferential grooves each extending between the circumferentially adjacent outside axial grooves so as to circumferentially and axially divide this part into blocks, wherein, when looking down on the tire, the outside axial grooves are inclined toward one direction such that the outer ends thereof are positioned backward of the inner ends with respect to an intended traveling direction, the inclination angle $\alpha$ of the outside axial grooves is in the range of from 60 to 80 degrees with respect to the tire equator C.

The outside circumferential grooves are inclined toward one direction such that the outer ends thereof are positioned forward of the inner ends. The inclination angle $\gamma$ of the outside circumferential grooves is in the range of from 15 to 45 degrees with respect to the tire equator C.

The inside axial grooves are inclined at an angle $\beta$ of 80 to 110 degrees with respect to the tire equator C, wherein the direction for measuring the angle $\beta$ is such that when the angle $\beta$ is less than 90 degrees, the inclination thereof is the same direction as the outside axial grooves.

Preferably, the inside tread part is provided with inside circumferential grooves each extending between the circumferentially adjacent inside axial grooves. The inside circumferential grooves are inclined towards the same direction as the outside circumferential grooves, at an angle $\delta$ of more than 0 degree with respect to the tire equator C but less than the angle $\gamma$.

BRIEF DESCRIPTION OF THE DRAWINGS

Embodiments of the present invention will now be described in detail in conjunction with the accompanying drawings, wherein.

DETAILED DESCRIPTION OF THE INVENTION

Figure 1:
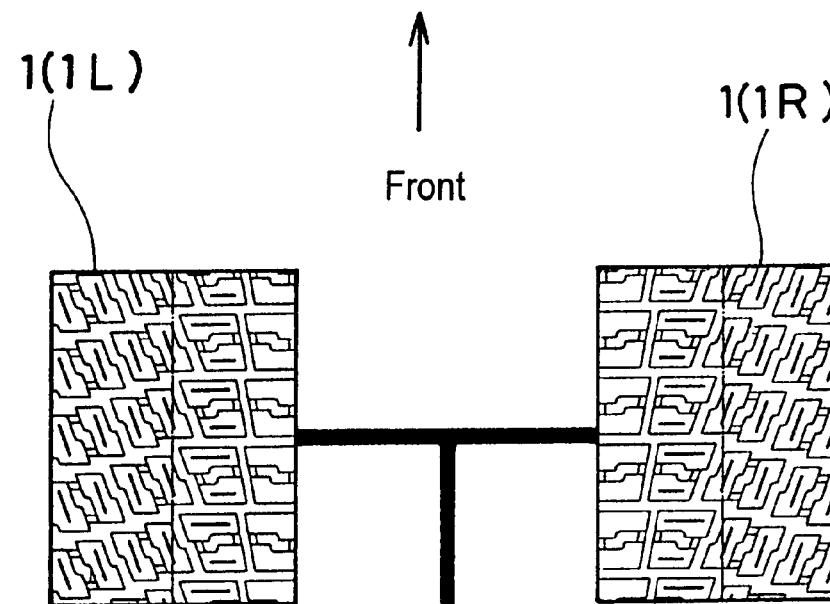
FIG. 1 shows the relative positions of tires according to the present invention to a vehicle body.
Figure 1:
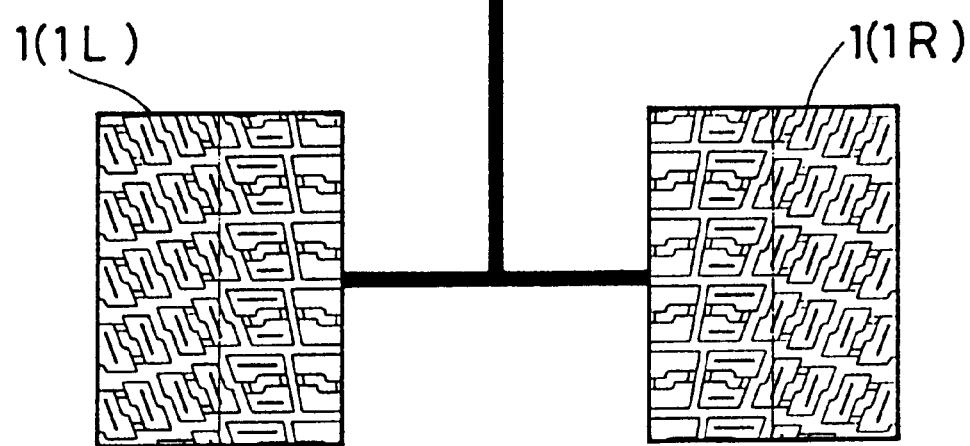

In the drawings, the tires according to the present invention are a pneumatic radial tire having a relatively low aspect ratio. Thus, the tire comprises a tread portion, a pair of axially spaced bead portions with a bead core therein, a pair of sidewall portions extending between the tread edges and the bead portions, a carcass extending between the bead portions, and a belt disposed radially outside the carcass in the tread portion as usual. However, the applicability is not limited to only a pneumatic radial tire.

FIG. 1 is a schematic view of pneumatic tires 1 (1R and 1L) according to the present invention and a car body when looking down at the car.

As shown in this figure, the tread pattern of the right tire 1R is inverse to that of the left tire 1L. In other words, the tread pattern of the left tire 1L and the tread pattern of the right tire 1R are asymmetrical about the center line of the car body when they are mounted on the wheel rims of the car. Further, the tread pattern of each tire 1R, 1L is asymmetric about the tire equator.

First, a type of the tread pattern according to the present invention will now be described according to FIG. 2 which shows the tread pattern of the left tire 1L when looking down the tire.

The tread portion has an outside tread edge To positioned on the outside of the car, and an inside tread edge Ti positioned on the inside of the car, and the tread portion comprises an outside part extending from the outside tread edge To toward the tread center, and an inside part extending from the inside tread edge Ti toward the tread center.

The outside tread part is provided with outside axial grooves 3 extending across the overall width thereof from the outside tread edge To to the vicinity of the tire equator C, and outside circumferential grooves 6 each extending between the adjacent outside axial grooves 3, whereby this part is divided into outside blocks Bo.

The inside tread part is provided with inside axial grooves 5 extending across the overall width thereof from the inside tread edge Ti to the vicinity of the tire equator C, and inside circumferential grooves 7 each extending between the adjacent inside axial grooves 5, whereby this part is divided into inside blocks Bi.

The outside axial grooves 3 are inclined in one direction such that the outer end o1 at the outside tread edge To is positioned backward of the inner end i1 when looking down (in the ground contacting patch, accordingly, the outer end o1 is forward.) The angle α of the center line X1 of the outside axial grooves 3 is set in the range of from 60 to 80 degrees with respect to the tire equator C.

The outside circumferential grooves 6 are inclined in one direction such that the outer end o3 is positioned forward of the inner end i3 when looking down. The angle γ of the center line X3 of the outside circumferential grooves 6 is set in the range of from 15 to 45 degrees with respect to the tire equator C.

The inside axial grooves 5 are inclined at an angle β in the range of from of 80 to 110 degrees, preferably about 90 degrees with respect to the tire equator C, wherein when the angle β is more than 90 degrees, the inclination is opposite to that of the outside axial grooves 3. The measuring direction is so defined.

The inside circumferential grooves 7 are inclined in the same direction as the outside circumferential grooves 6. The inclination angle δ thereof with respect to the tire equator C is more than zero but less than the angle γ, preferably less than ½ of the angle γ.

In the left tire 1L, as shown in FIGS. 1–4, the grooves 3 and 6 in the outside part as a whole are more inclined toward the counterclockwise direction than the grooves 5 and 7 in the inside part. In the right tire 1R, in contrast, as shown in FIG. 1, the grooves 3 and 6 in the outside part as a whole are more inclined toward the clockwise direction than the grooves 5 and 7 in the inside part.

The number N5 of the inside axial grooves 5 around the tire is more than the number N3 of the outside axial grooves 3. In this example, N5 is twice N3.

The number of the inside circumferential grooves 7 counted along one of the inside axial grooves 5 is 1 or 2 and less than the number of the outside circumferential grooves 6 counted along one of the outside axial grooves 3.

The outside blocks Bo have a shape which is generally a circumferentially elongated parallelogram. On the other hand, the inside blocks Bi have a shape which is generally an axially elongated parallelogram.

The above-mentioned "vicinity" of the tire equator C is defined as a tread center region YC extending from the tire equator C towards each side thereof by an axial distance of 10% of the tread width TW between the tread edges To and Ti.

Preferably, the outside tread part provided with the axial grooves 3 and circumferential grooves 6 extends slightly beyond the tire equator C, and thus, the inside tread part provided with the axial grooves 5 and circumferential grooves 7 extends to a position before the tire equator C. In practice, however, to change the tread pattern smoothly from the outside tread part to the inside tread part, a transitional part is preferably formed therebetween.

Next, a more practical example will be described in conjunction with FIGS. 2 and 3 which also show a left tire 1L.

In this example, the outside axial grooves 3 have a zigzag configuration which is formed by overlapping straight groove components 9 successively in a step form. The overlap is almost one half length of each component. Each straight component 9 is parallel to the tire axial direction, but each of the outside axial grooves 3 as a whole is inclined as explained above. In this case or in case of a zigzag groove, the above-mentioned inclination angle α is defined as of a straight line X1 drawn between the inner end i1 and the outer end o1 or the center line of the zigzag amplitude. Apart from straight or zigzag configurations, curved configurations may be used for the outside axial grooves 3.

The outside circumferential grooves 6 in this example also have a zigzag configuration which is formed by providing a short axial component in the middle of the length. Also, apart from straight or zigzag configurations, curved configurations may be used. The above-mentioned inclination angle γ is defined as of a straight line X3 drawn between the inner end i3 and the outer end o3 or the center line of the zigzag amplitude. In this example, two circumferential components 11 on both side of the axial component are straight and each satisfies the above-mentioned limitation for the angle γ.

In a region surrounded by the tire equator C, the outside tread edge To, and circumferentially adjacent two outside axial grooves 3, three outside circumferential grooves 6 are disposed. On the inside of the tire equator C or in the above-mentioned transitional part, a further circumferential groove 13 is disposed, which is almost the same as the outside circumferential groove 6 in respect of the configuration and inclination.

The inside axial grooves 5 in this example comprise straight grooves 5A and zigzag grooves 5B which are alternately arranged in the circumferential direction. The straight grooves 5A are parallel to the axial direction. The straight grooves 5A align with and are connected with the innermost straight components of the outside axial grooves 3. The zigzag grooves 5B are each composed of axial components parallel to the axial direction and two short circumferential components parallel to the circumferential direction. Each zigzag groove 5B as a whole is parallel to the axial direction. The zigzag grooves 5B are each opened to one of the circumferential grooves 13 in the middle of the length.

The inside circumferential grooves 7 are straight and inclined at an angle δ of less than ½ of the angle γ as explained above.

In this embodiment, further, tie-bars 16o and 16i extending between adjacent blocks are provided. In the outside part, tie-bars 16o are disposed in the circumferential grooves 6 (first and third grooves from the outside tread edge To) to connect the axially adjacent blocks in pairs to increase the lateral stiffness and thereby improve cornering force and uneven wear. In the inside part, tie-bars 16i are disposed in the axial grooves 5B to connect the circumferentially adjacent blocks in pairs to increase circumferential stiffness and thereby improve traction and uneven wear.

Therefore, in the outside tread part, four rows of blocks Bo are formed. The blocks Bo has a shape which is generally a circumferentially elongated parallelogram like a periscope. The front and rear edges 10 thereof are substantially parallel to the tire axial direction although the outside axial groove as a whole inclines at the angle α. As to the side edges, the greater part thereof inclines at the angle γ.

In the inside tread part, two rows of blocks Bi are formed. The blocks Bi has a shape which is generally an axially elongated trapezoid. The edges 12 facing the axial grooves 5A and the greater part of the edges facing the axial grooves 5B incline at the angle β which are substantially parallel to the tire axial direction. The side edges facing the inside circumferential grooves 7 incline at the angle δ.

Incidentally, in the transitional part between the outside and inside tread parts, a circumferentially continuous groove 2 is formed by the circumferential grooves 13 and axial groove components 13. It is possible to dispose a circumferentially continuous straight groove instead of zigzag groove. However, zigzag is preferable. In case of zigzag, it is preferable that the center of the zigzag is within the above-mentioned tread center region YC and the tire equator C is within the amplitude of the zigzag.

As to the widths and depths of the above-mentioned grooves 2, 3, 5, 6 and 7, values which are usually employed in off-road tires, for example a width of 4 to 20 mm and a depth of 6 to 15 mm may be employed. In this example, the grooves 2, 3, 5, 6 and 7 are the same depth, but may be differed.

Comparison Tests: Plural pairs of right and left tires in a size of 205/65R15 were prepared and tested for traction, side grip and off-road lap time. The tires were the same structure except for the tread patterns. The specifications of the test tires and the test results are shown in Table 1. The test tires were mounted on four wheels of a 4WD-car (2000 cc) as shown in FIG. 1. On an off-road circuit course of 2.2 km around, lap time was measured, and at the same time, the traction and side grip were evaluated into five ranks by the test driver's feeling. The larger the value, the better the performance.

TABLE 1

Figure 2:
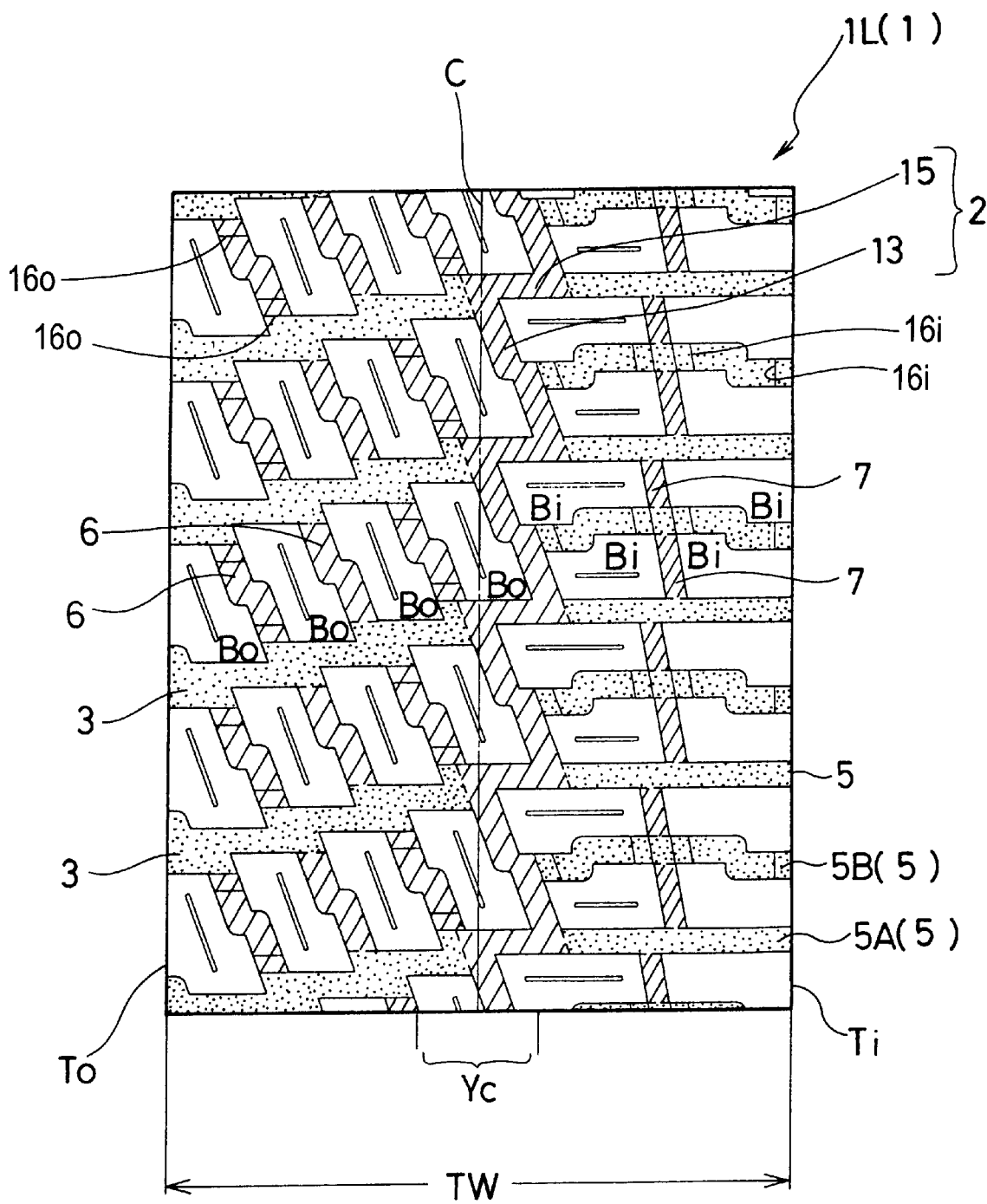
FIG. 2 is a developed plan view of a left tire showing an example of the tread pattern.
Figure 3:
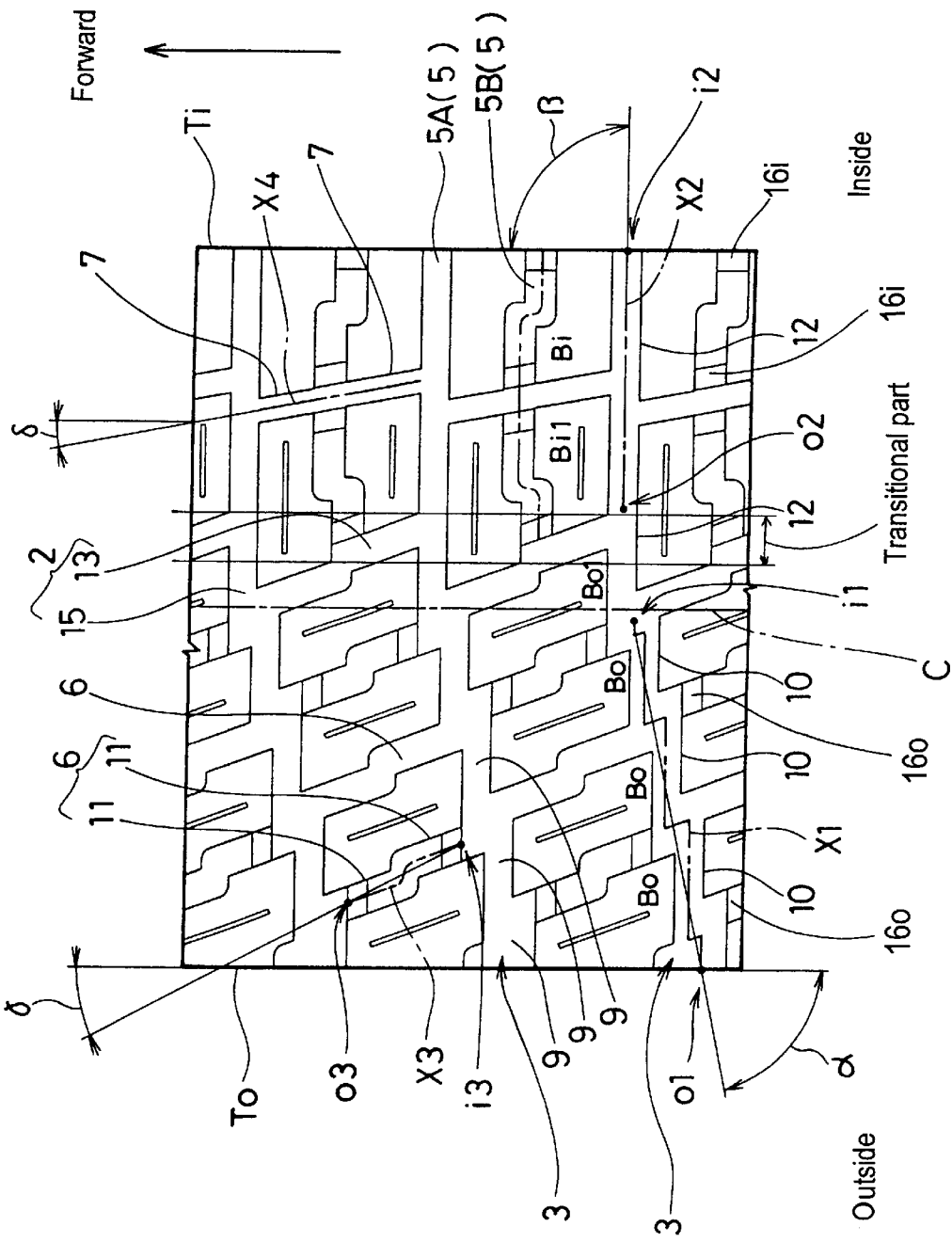
FIG. 3 is an enlarged partial view thereof.
Figure 4:
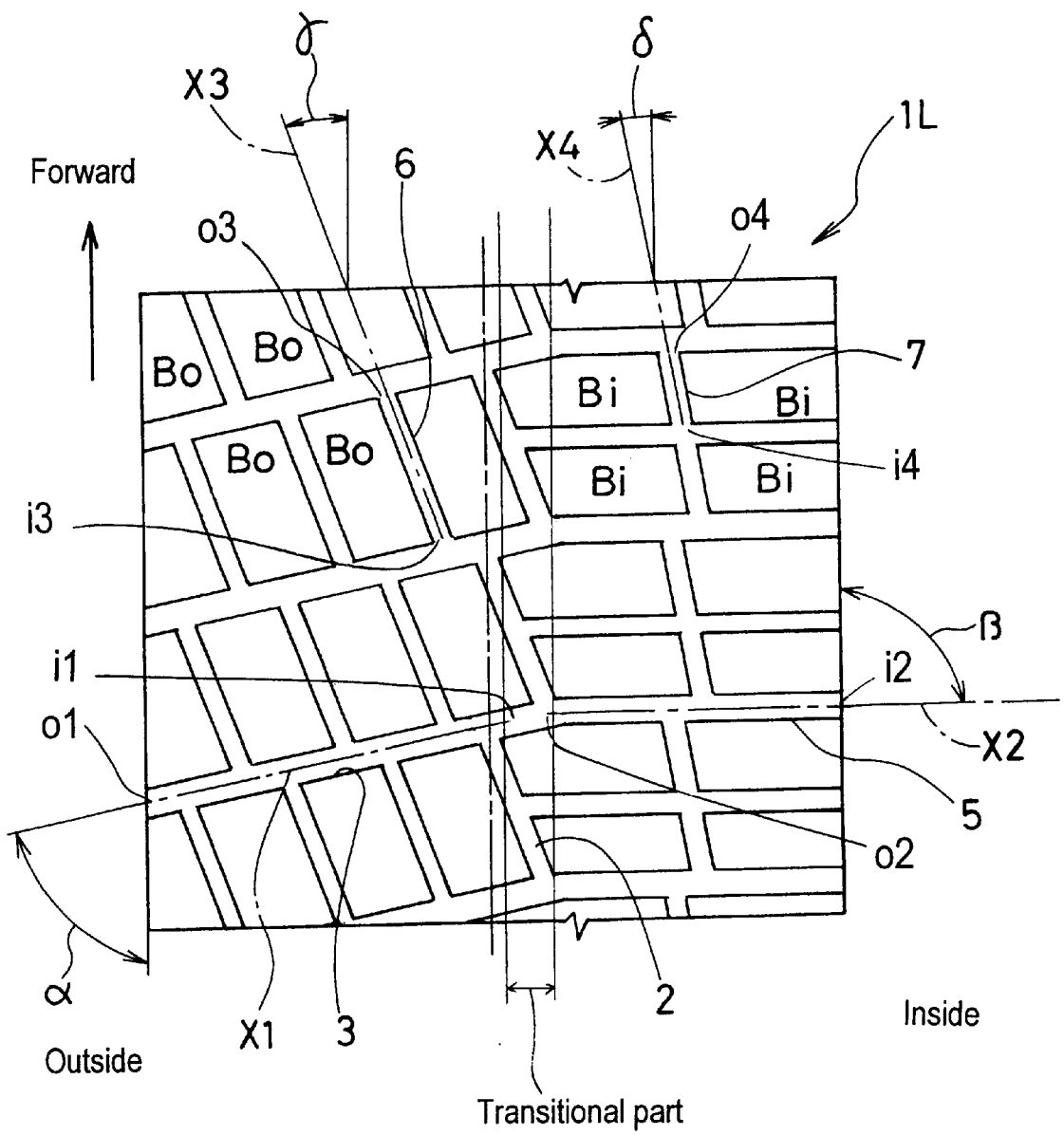
FIG. 4 shows a typical basic tread pattern according to the present invention.
Figure 5:
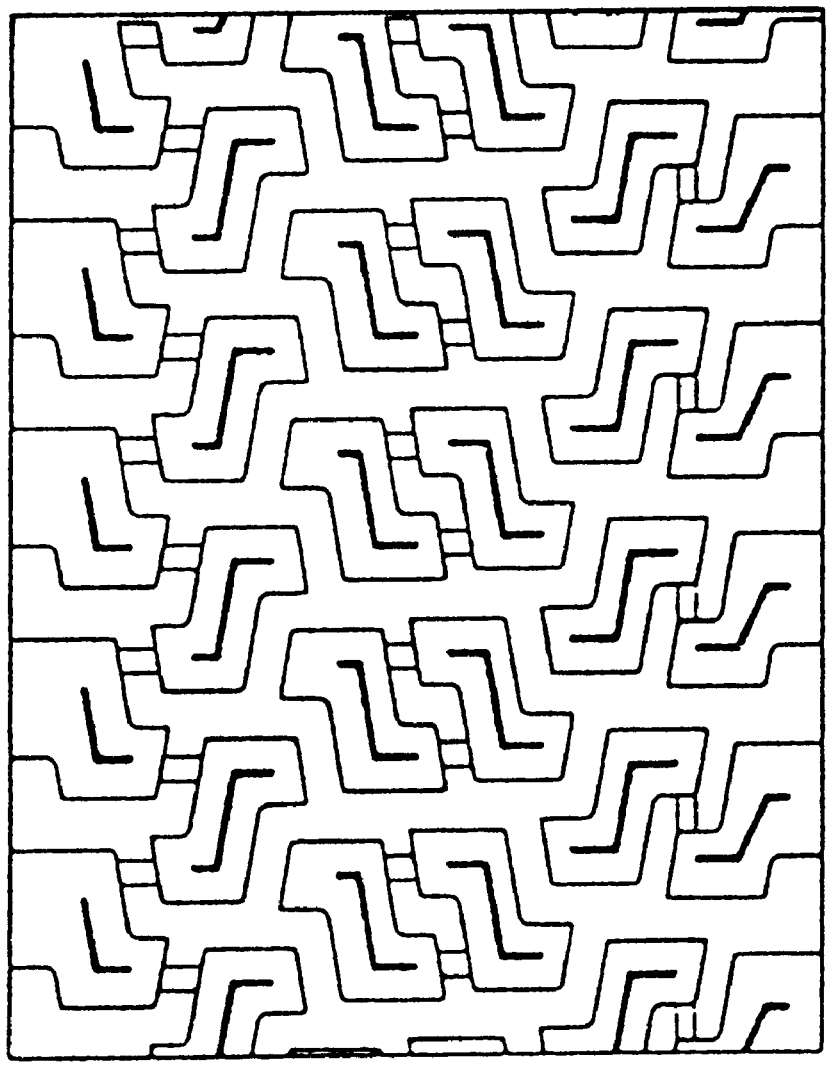
FIG. 5 shows the tread pattern of a comparative example.

|  | Ex. 1 | Ref. 1 | Ref. 2 | Ref. 3 |
|---|---|---|---|---|
| Tread pattern |  |  |  |  |
| Left | FIG. 2 | FIG. 2 | FIG. 2 | FIG. 5 |
| Right | Inverse | Inverse | Inverse | FIG. 5 |
| angle α (deg.) | 85 | 90 | 40 | — |
| angle β (deg.) | 90 | 90 | 70 | — |
| angle γ (deg.) | 20 | 5 | 50 | — |
| angle δ (deg.) | 10 | 0 | 20 | — |
| Test Results |  |  |  |  |
| Traction | 4 | 3.5 | 3 | 3 |
| Side grip | 4 | 3.5 | 3 | 3 |
| Lap time | 1'34"0 | 1'34"5 | 1'35"1 | 1'35"5 |

As shown in Table 1, the pneumatic tires according to the present invention could be greatly improved in both the off-road traction and side grip and displayed a good road ability. When the angles α, β, γ are outside the above-mentioned range and the inclining directions of the grooves are different from the above, it was difficult to improve both the off-road traction and side grip at the same time.

The present invention can be suitably applied to pneumatic tires for off-road use such as rally, dirt trial and the like.

The invention being thus described, it will be obvious that the same may be varied in many ways such variations are not to be regarded as a departure from the spirit and scope of the invention, and all such modifications as would be obvious to one skilled in the art are intended to be included within the scope of the following claims.

What is claimed is:

1. A vehicle tire comprising a tread having an outside tread edge and an inside tread edge, the tread having an inside tread part extending form the inside tread edge toward a tire equator C, and an outside tread part extending from the outside tread edge toward the tire equator, the inside tread part being provided with inside axial grooves extending axially across this part so as to circumferentially divide this part into inside blocks, and inside circumferential grooves each extending between the circumferentially adjacent inside axial grooves, the inside circumferential grooves being inclined towards the same direction as the outside circumferential grooves, at an angle δ, the outside tread part provided with outside axial grooves extending axially across this part, and outside circumferential grooves each extending between the circumferentially adjacent outside axial grooves so as to circumferentially and axially divide this part into outside blocks, wherein, when looking down at the tire, the outside axial grooves which have outer ends and inner ends are inclined toward one direction such that the outer ends thereof are positioned backward of the inner ends with respect to an intended traveling direction, an inclination angle α of the outside axial grooves being in the range of from 60 to 80 degrees with respect to the tire equator C, the outside circumferential grooves are inclined toward one direction such that the outer ends thereof are positioned forward of the inner ends, an inclination angle δ of the outside circumferential grooves being in the range of from 15 to 45 degrees with respect to the tire equator C, the angle δ being less than the angle γ and the inside axial grooves are inclined at an angle β of 80 to 100 degrees with respect to the tire equator C.

2. The vehicle tire according to claim 1, wherein the longitudinal directions of the outside blocks are generally circumferential, and the longitudinal directions of the inside blocks are generally axial.

3. The vehicle tire according to claim 1, wherein the outside axial grooves has a step-formed configuration, and the front and rear edges of the outside blocks are substantially parallel to the axial direction.

* * * * *